Oct. 29, 1968
E. A. OHM
3,408,498
OPTICAL MODULATOR
Filed Dec. 28, 1965
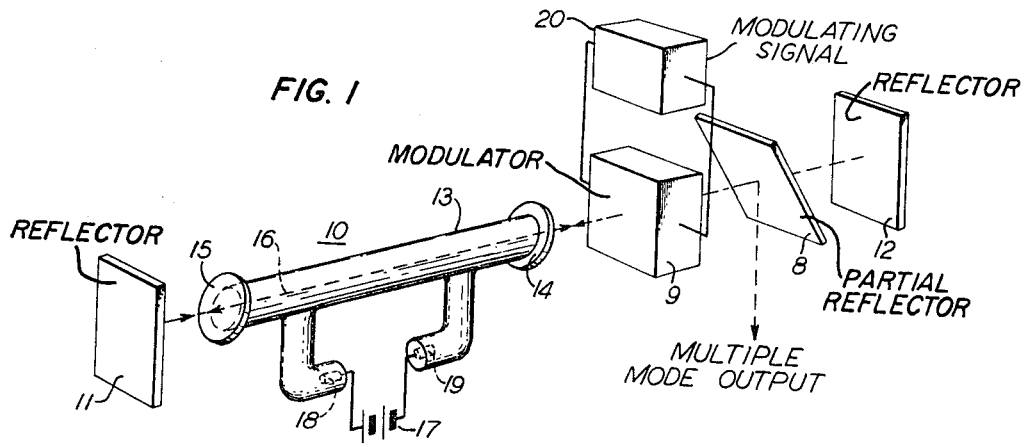
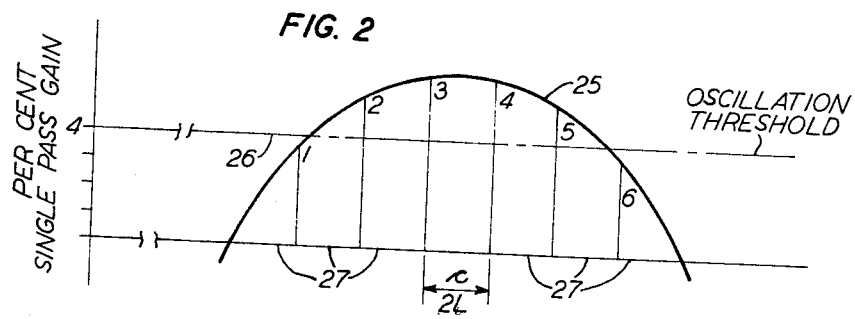
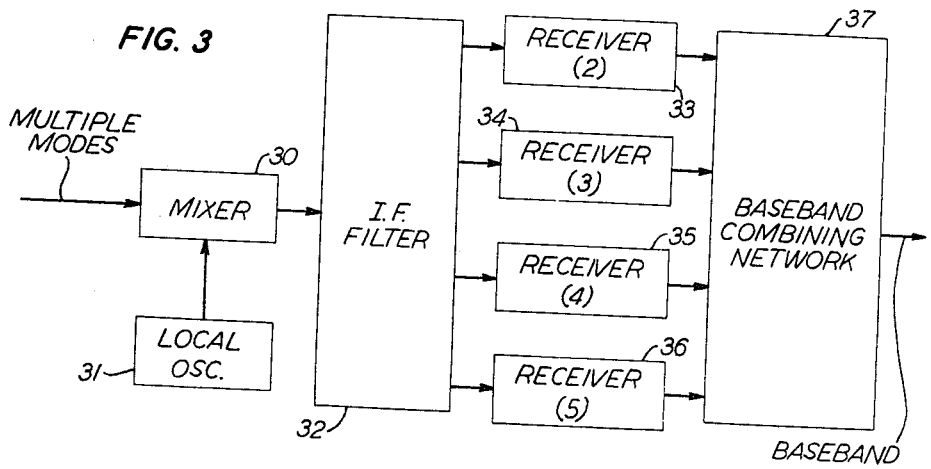
INVENTOR
E. A. OHM
BY
*Kenneth W. Mateer*
ATTORNEY

United States Patent Office 3,408,498
Patented Oct. 29, 1968

3,408,498
OPTICAL MODULATOR
Edward A. Ohm, Shrewsbury, N.J., assignor to Bell Telephone Laboratories, Incorporated, New York, N.Y., a corporation of New York
Filed Dec. 28, 1965, Ser. No. 517,003
4 Claims. (Cl. 250—199)

ABSTRACT OF THE DISCLOSURE

A modulation system for an optical maser beam including a plurality of frequency spaced longitudinal modes. Instead of suppressing all but one of the modes present, or pulse modulating the laser by application of a modulating frequency equal to the mode frequency spacing, this system provides for modulation of the simultaneously oscillating multiple modes in parallel, and separate detection of each spaced carrier frequency, resulting in increased useful received power, and an improved signal-to-noise ratio.

---

This invention relates to multimode optical maser systems and, in particular, to means for improving the performance of multimode optical modulators.

Means for generating electromagnetic waves in the infrared, visible, and ultraviolet frequency ranges, hereinafter referred to collectively as the optical frequency range, have been disclosed in United States Patent No. 2,929,922 issued to A. L. Schawlow and C. H. Townes and in the copending application of A. Javan Ser. No. 277,651, filed May 2, 1963, and assigned to the assignee of this application.

Masers designed for use at microwave frequencies typically have comprised a negative temperature medium contained within a cavity resonator tuned to resonance at or near the frequency at which stimulated emission was desired. Cavity resonator design at microwave frequencies was relatively simple since the structural dimensions could be made equal to a single wavelength at the chosen frequency.

At optical frequencies, however, this design approach is impractical due to the extremely small wavelengths involved. Instead, therefore, it has been necessary to design optical cavity resonators which are thousands of times larger than the wavelength of signals in the operating frequency range.

One such structure which has been used successfully for this purpose is the Fabry-Perot interferometer comprising two spaced reflective surfaces having an axis normal to each surface. The active medium of the laser is located between the reflective surfaces, at least one of which can be partially transmissive to permit coupling energy out of the device. Optical masers of this type are described in the United States patent and patent application referred to hereinbefore.

Wave energy generated in the disclosed laser structures is characterized by a high degree of coherence. Additionally, because of the very high frequency of optical wave energy, enormous amounts of signal information can potentially be carried by it, and such energy is therefore particularly useful as a carrier wave in a communication system. However, efficient utilization of the large information carrying potential depends on the availability of means for modulating energy at the high frequencies involved.

Various arrangements have been disclosed for both angle and amplitude modulation of optical waves. In general, angle modulation has been preferred due to the relatively higher resultant signal-to-noise ratio theoretically possible.

Cavity resonators for optical frequencies, however, have physical dimensions which are much larger than the wavelength of the signals resonated therein and therefore they are inherently multimode devices. Consequently, optical maser oscillators tend to be capable of simultaneous oscillation at a plurality of bands of frequencies having center-to-center frequency spacing $f_c$ given by $c/2L$, where $c$ is a velocity of light and $L$ is the effective cavity length. The output spectrum from typical optical maser generators therefore consists of a plurality of spaced, discrete bands of frequencies.

In general the presence of many individual frequency bands, or longitudinal modes as they are more usually called, in the output of optical generators has been deemed undesirable. Varied measures have been introduced to suppress or filter all but a single longitudinal mode. See for example U.S. Patents 3,134,837, issued May 26, 1964 to P. P. Kisliuk and D. A. Kleinman; or 3,187,270, issued June 1, 1965 to H. W. Kogelnik and C. K. N. Patel. The net effect of the mode purification is generally to reduce the total available output power, and to lower the signal-to-noise ratio. In optical communication systems, and in modulators in particular, such effects are undesirable.

In accordance with the invention, a plurality of simultaneously oscillating modes of a laser generator are identically modulated and transmitted to a distant receiving station. At the reception point the plurality of modulated carriers are separated and demodulated, and the signal energy is combined to form a single output.

According to a preferred embodiment of the invention, a negative temperature medium is disposed within an environment proportioned to effect multiple longitudinal mode generation. Means for frequency modulating the multiple modes in unison is disposed within the mode generator, with distant receiving means including demodulators for each of the several modulated carriers interconnected via a wideband transmission medium.

The above and other objects of the invention, together with its various features and advantages, will become more apparent upon consideration of the accompanying drawing and detailed description thereof which follows:

In the drawing:

FIG. 1 is a pictorial representation of a laser modulator in accordance with the invention;

FIG. 2 illustrates the modal configuration in the laser of FIG. 1; and

FIG. 3 is a block diagram of a receiver for the multiple carrier modulator of FIG. 1.

Referring now in detail to the drawing, FIG. 1 is an illustrative embodiment of an optical maser modulator in accordance with the invention comprising active medium 10, modulation means 9 controlled by modulating signal source 20, and a partially reflecting mirror 8, all disposed within a cavity defined by reflectors 11 and 12.

Because the invention has particular application at optical frequencies, it is described herein in connection with optical masers, or lasers.

Thus, for purposes of illustration, the active medium may be a gaseous mixture of helium and neon enclosed in an elongated tube 13. However, it is to be understood that the principles of the invention are applicable in any frequency band for which multiple frequency maser generators can be constructed, and are not necessarily limited to the optical frequency range.

To minimize reflections and to polarize the laser beam, the ends 14 and 15 of the tube 13 are inclined to the beam axis 16 at the Brewster angle $\theta$, defined as $\tan^{-1} \theta = n_2/n_1$ where $n_2$ is the index of refraction of the medium into which the beam energy propagates at the interface and $n_1$ is the index of refraction of the medium out of which the beam energy emerges at the interface. A D-C power source 17 is connected to electrodes 18 and 19 for supplying the power necessary to produce and maintain a gas discharge within tube 13. It is to be understood, however, that other means well known in the art, can be used for producing a population inversion in the active medium and that materials other than gaseous helium-neon can be used as the active medium. For a detailed discussion of lasters, see the article by A. Yariv and J. P. Gordon, entitled, "The Laser," published in the January 1963 issue of the Proceedings of the Institute of Radio Engineers.

The reflectors 11, 12, which define the laser cavity, can have plane surfaces, curved surfaces, or a combination of one plane surface and one curved surface. One of the reflectors can be partially transmissive to permit abstraction of a portion of the energy or, as shown in FIG. 1, a semitransparent reflector 8 can be introduced on axis 16 between modulation means 9 and reflector 12 to divert a small portion of the resonating energy from the cavity. Alternatively, a prism arrangement can be used or modulation means 9 can be itself configured to divert a portion of the energy from the cavity on each energy pass.

The resonant cavity formed by reflectors 11, 12 is characterized by a length $L$ between the reflectors measured along axis 16, and by a series of resonant frequencies spaced apart by $c/2L$, where $c$ is the velocity of light. Thus, the negative temperature medium, when suitably pumped, can be stimulated to emit radiation which will resonate at a plurality of these spaced resonant frequencies of the cavity. FIG. 2 illustrates, in graphical form, a typical gain-frequency characteristic associated with the resonant arrangement of FIG. 1. In FIG. 2 curve 25 is the Doppler broadened laser linewidth of the negative temperature medium, and horizontal broken line 26 represents the inherent losses associated with the laser arrangement. Vertical lines 27 represent the resonant frequencies of the cavity, and are spaced apart $c/2L$ as discussed above.

When the gain for a given resonant frequency exceeds the threshold losses (indicated to be typically about 4 percent of single pass gain), oscillation is possible. In FIG. 2 it can be seen that the frequencies numbered 1 and 6 are precluded from oscillation since the threshold loss exceeds the available gain, but that frequencies 2 through 5 will oscillate.

Heretofore, it has been deemed desirable to suppress the simultaneous presence of a plurality of spaced resonant frequencies in many modulation systems. In general such suppression was deemed necessary for simplicity and to prevent overlapping and confused modulation spectra within the resonant laser environment.

When, however, the laser is internally modulated with a resultant modulation spectrum which, for a given carrier, does not overlap the spectrum of an adjacent carrier, multiple carrier modulation becomes possible. In many practical phase modulation arrangements, such a restriction on modulation bandwidth is not severe.

For example, as disclosed in my copending application Ser. No. 425,412, filed Jan. 14, 1965, and assigned to the assignee of this application, modulation means 9 in FIG. 1 can advantageously comprise the combination of three birefringement elements of which the first is a polarization converter, the second is a differential phase shifter and the third is a second polarization converter.

In particular phase modulation of the polarized optical carrier is produced by inducing first and second wave components having a polarization perpendicular to that of the carrier within the cavity. The first induced component is amplitude modulated with the desired signal and the second induced component is also amplitude modulated with the same desired signal, but is delayed 90 degrees in time phase with respect to the first component. The converted components, both with a polarization normal to that of the laser carrier, are coupled from the cavity by polarization selective means. The resultant of the converted components is a phase modulated wave having a phase index which can vary over a substantially unlimited range. For a complete disclosure of such a modulation arrangement, the specification of my above-identified copending application which is incorporated by reference herein, should be consulted.

In practice, the restriction of the total modulation bandwidth to less than $c/2L$ is not unduly severe due to the limitations already imposed by the stray capacitance associated with the physical components and by the relatively high impedance levels required by the practical drive circuits associated with typical optical modulation media such as potassium dihydrogen phosphate (KDP).

With the limitation to a single carrier frequency removed, simultaneous modulation of each of the carriers identified as 2, 3, 4, and 5 in FIG. 2 can proceed. The result is a larger total output power and an improved signal-to-noise ratio. Thus the laser output is most efficiently used by modulating the baseband on the plural carriers in unison, and transmitting the plurality simultaneously to a receiving station.

A typical receiving terminal is shown in block form in FIG. 3, in which the multiple mode output of FIG. 1 is incident upon mixer 30 and is combined with the fixed frequency from local oscillator 31 to produce an intermediate frequency (IF) signal. The composite IF signal is separated by IF filter 32 into the plurality of separate signal portions originally transmitted. Receivers 33 through 36 emit separate replicas of the original baseband modulating signal which are combined in network 37 to produce a single output at baseband which corresponds to the signal impressed on modulating means 9 by signal 20 in FIG. 1.

An additional aspect of the invention is the potential diversity advantage offered by the presence of a plurality of frequency spaced carriers. Whereas for a single carrier system, signal fading may readily occur, it is less likely that simultaneous fading would occur on, for example, carrier frequencies 2 and 5. The advantages of diversity reception can be realized by incorporating well known diversity receiver principles into the arrangement of FIG. 3.

While the invention has been disclosed with reference to a particular modulation arrangement, it is not intended to be limited in this regard. For example, the narrow index modulation arrangement disclosed in the copending application of S. E. Miller, Ser. No. 374,326, filed June 11, 1964, and assigned to the assignee of this application, can alternatively be used.

In all cases, it is to be understood that the above-described arrangements are illustrative of but a small number of the many specific embodiments which can represent applications of the principles of the invention. Numerous and varied other arrangements can be devised in accordance with these principles by those skilled in the art without departing from the spirit and scope of the invention.

What is claimed is:

1. A modulation system for coherent optical energy comprising an optical maser source characterized by a plurality of simultaneously oscillating frequency spaced longitudinal modes, means for modulating each of said modes with identical information, means for receiving said modulated modes, said receiving means comprising separate detectors for each of said modes, and means for combining the outputs of each of said detectors.

2. The system according to claim 1 in which said modes are spaced at distances equal to $c/2L$ where $c$ is the velocity of light and $L$ is the effective length of the resonant environment of the laser source, said modulating means having a modulation bandwidth less than $c/2L$.

3. In combination, a laser source characterized by a resonant environment of length $L$ and a plurality of simultaneously oscillating longitudinal laser modes: a source of a baseband modulating signal; and means having a modulation bandwidth less than $c/2L$, where $c$ is the velocity of light, for impressing said baseband signal upon each of said longitudinal modes in unison.

4. In combination with the apparatus of claim 3, means for receiving said plurality of modulated modes, said means including separate receivers for each of said modes.

References Cited

UNITED STATES PATENTS 3,144,647  8/1964  Sichak _____ 325—154

OTHER REFERENCES

James R. McDermott, Space and Aeronautics, Transmitters and Receivers for Optical Communications, June 1963, pp. 98–106.

ROBERT L. GRIFFIN, *Primary Examiner.*

A. MAYER, *Assistant Examiner.*